US007402971B2

(12) United States Patent
Averitt

(10) Patent No.: US 7,402,971 B2
(45) Date of Patent: Jul. 22, 2008

(54) MOVABLE PARTITION MONITORING SYSTEMS AND METHODS

(75) Inventor: Scott Averitt, Roseville, MI (US)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 11/346,130

(22) Filed: Feb. 2, 2006

(65) Prior Publication Data

US 2007/0176463 A1    Aug. 2, 2007

(51) Int. Cl.
*H02P 3/00* (2006.01)

(52) U.S. Cl. ........................ 318/466; 318/266; 318/282; 318/286; 49/252

(58) Field of Classification Search ................. 318/280, 318/445, 286, 266, 257, 467, 282, 466, 468; 49/352; 701/49
See application file for complete search history.

(56) References Cited

U.S. PATENT DOCUMENTS

| | | | | |
|---|---|---|---|---|
| 4,529,920 | A * | 7/1985 | Yoshida et al. | 318/466 |
| 4,563,625 | A * | 1/1986 | Kornbrekke et al. | 318/603 |
| 4,922,168 | A * | 5/1990 | Waggamon et al. | 318/286 |
| 4,965,502 | A * | 10/1990 | Ogasawara | 318/628 |
| 5,039,925 | A * | 8/1991 | Schap | 318/282 |
| 5,044,222 | A | 9/1991 | Tanaka et al. | |
| 5,076,016 | A | 12/1991 | Adams et al. | |
| 5,105,131 | A * | 4/1992 | Schap | 318/282 |
| 5,250,882 | A * | 10/1993 | Odoi et al. | 318/467 |
| 5,404,673 | A | 4/1995 | Takeda et al. | |
| 5,585,702 | A * | 12/1996 | Jackson et al. | 318/266 |
| 5,616,997 | A * | 4/1997 | Jackson et al. | 318/467 |
| 5,682,090 | A * | 10/1997 | Shigematsu et al. | 318/468 |
| 5,749,173 | A | 5/1998 | Ishida et al. | |
| 5,755,059 | A | 5/1998 | Schap | |
| 5,793,173 | A * | 8/1998 | Henschel et al. | 318/467 |
| 5,833,301 | A | 11/1998 | Watanabe et al. | |
| 5,990,646 | A | 11/1999 | Kovach et al. | |
| 6,108,976 | A | 8/2000 | Kato et al. | |
| 6,166,508 | A * | 12/2000 | Kalb | 318/632 |
| 6,194,851 | B1 * | 2/2001 | Denault et al. | 318/139 |
| 6,198,242 | B1 | 3/2001 | Yokomori et al. | |
| 6,420,843 | B1 * | 7/2002 | Pohl | 318/266 |
| 6,424,109 | B2 * | 7/2002 | Ochiai et al. | 318/445 |
| 6,799,669 | B2 | 10/2004 | Fukumura et al. | |
| 6,803,733 | B1 * | 10/2004 | Shabana et al. | 318/280 |
| 6,922,031 | B2 * | 7/2005 | Engelgau et al. | 318/286 |
| 6,925,757 | B2 | 8/2005 | Priest et al. | |
| 6,936,984 | B2 * | 8/2005 | Wilson | 318/280 |

(Continued)

FOREIGN PATENT DOCUMENTS

| | | |
|---|---|---|
| DE | 10141859 | 4/2002 |

(Continued)

*Primary Examiner*—Paul Ip
(74) *Attorney, Agent, or Firm*—Michael Best & Friedrich LLP

(57) ABSTRACT

A method and system for monitoring a movable partition. In one embodiment, the system includes a sensor linked to a movable partition, a drive system, and a controller. The drive system is configured to move the movable partition. The sensor, which in one embodiment includes a drum connected to the partition by a cable, is independent of the drive system. The sensor transmits a signal indicative of the rotational motion of the drum to the controller, which receives the transmitted signal and calculates at least one of a speed, acceleration, position, and direction of movement of the movable partition.

27 Claims, 2 Drawing Sheets

U.S. PATENT DOCUMENTS

| | | | | |
|---|---|---|---|---|
| 7,164,117 | B2 * | 1/2007 | Breed et al. | 250/221 |
| 7,218,069 | B2 * | 5/2007 | Imai et al. | 318/257 |
| 2002/0008483 | A1 * | 1/2002 | Kaeufl et al. | 318/280 |
| 2002/0047678 | A1 * | 4/2002 | Wilson | 318/445 |
| 2002/0157313 | A1 | 10/2002 | Fukazawa et al. | |
| 2003/0062866 | A1 * | 4/2003 | Elsinghorst et al. | 318/445 |
| 2005/0039405 | A1 | 2/2005 | Yokomori | |
| 2005/0203690 | A1 * | 9/2005 | Russ et al. | 701/49 |
| 2006/0059781 | A1 * | 3/2006 | Berklich et al. | 49/352 |
| 2006/0254148 | A1 * | 11/2006 | Noro et al. | 49/352 |

FOREIGN PATENT DOCUMENTS

| | | |
|---|---|---|
| DE | 20309093 U | 8/2003 |
| FR | 2871879 | 12/2005 |

* cited by examiner

MOVABLE PARTITION MONITORING SYSTEMS AND METHODS

BACKGROUND

Many vehicles include movable partitions (e.g., a window, a sunroof, a sliding door, etc.) that are displaced using a partition drive system. For example, a window in a door of a vehicle may be moved up and down using a direct-current ("DC") permanent magnet electric motor. In order to effectively move partitions, drive systems need to produce a significant amount of force. As a result, partition drive systems can produce forces that pose safety hazards. For example, an automatic window closure system could trap a finger or hand.

SUMMARY

The following summary sets forth certain example embodiments of the invention described in greater detail below. It does not set forth all such embodiments and should in no way be construed as limiting of the invention.

In one embodiment, a system for monitoring a movable partition includes a cable having a first end and a second end. The movable partition is coupled to the first end of the cable. A drive system is also included in the system and can move the movable partition. A drum is coupled to the second end of the cable, and the drum is independent of the drive system. A sensor transmits a signal indicative of the rotational motion of the drum, while a controller receives the transmitted signal and calculates at least one of a speed, acceleration, position, and direction of movement of the movable partition.

In another embodiment, a method of monitoring a movable partition includes providing a rotatable drum configured to be independent of a drive system for the movable partition; linking the rotatable drum and the movable partition via an attachment element; generating a first signal with a sensor, the first signal indicative of rotational motion of the rotatable drum; receiving, by a controller, the first signal; and generating, by the controller, a second signal using data from the first signal, the second signal indicative of at least one of a speed, a position, a direction of travel, and an acceleration of the movable partition.

In another embodiment, a vehicle having a system for monitoring a movable partition includes a movable partition, a drive system, a sensor, and a controller. The drive system moves the movable partition. A sensor, which is mechanically linked to the partition but decoupled from the drive system, transmits a signal indicative of the rotational motion of the drum. The controller receives the transmitted signal and calculates at least one of a speed, acceleration, position, and direction of movement of the movable partition. The controller also generates a signal indicative of an obstruction in a path of the movable partition.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention relate to systems and methods of monitoring motion of a movable partition. In an embodiment, a movable partition monitoring system is provided that is separated or decoupled from a drive system of the movable partition. Providing a monitoring system that is independent of the drive system can produce a more accurate representation of partition motion. For example, embodiments herein can reduce inaccuracies inherent in partition monitoring systems that are incorporated into the partition drive system (e.g., inaccuracies due to drive motor start-up conditions). Additionally, a decoupled monitoring system can be applied to a variety of different partition monitoring applications, without having to be designed and integrated into the drive system for each specific application.

Figure 1:
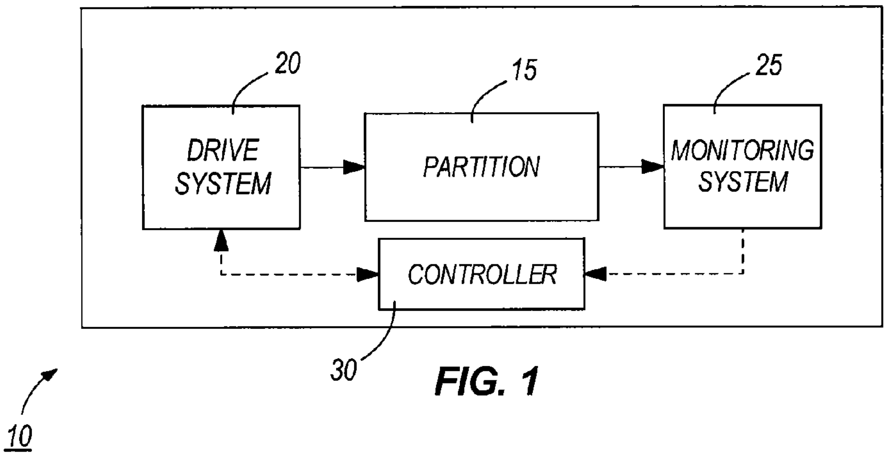
FIG. 1 is a block diagram of an exemplary system that includes a movable partition monitoring system.

FIG. 1 is a block diagram of a system 10 that generally includes a movable partition 15, a partition drive system 20, and a partition monitoring system 25. The drive system 20 is used to move the partition 15, while the monitoring system 25 tracks or monitors the motion of the partition 15, as described in greater detail below. In some embodiments, a controller 30 (described in greater detail below) is also included.

The movable partition 15, most generally, is any partition that is movable via a drive system. For example, in some embodiments, the movable partition 15 is a movable vehicle partition such as a window, a sunroof, a sliding door, a trunk hatch, and the like. Other non-vehicle related movable partitions 15 include slidable room partitions or garage doors, for example. The drive system 20 includes the components that are used to move the partition 15. In one embodiment, the drive system 20 includes a permanent magnet DC motor, a plurality of pulleys and/or gears, and a cable. In other embodiments, the drive system 20 can include a different type of motor, or other mechanical components to aid in moving the partition 15. The monitoring system 25, as described in greater detail below, may also include multiple gears or pulleys and a cable. As shown in FIG. 1, the monitoring system 25 is separated or decoupled from the drive system 20. For example, instead of being directly connected to the drive system 20, the monitoring system 25 is mechanically linked to the partition 15. Thus, in the embodiment shown in FIG. 1, the only mechanical link between the drive system 20 and the monitoring system 25 is whatever indirect link that may exist through the partition 15. For example, although the monitoring system 25 is sensitive to relatively small variations or changes in the status of the partition 15, the monitoring system 25 has relatively little mechanical input to the drive system 20. As a result, the monitoring system 25 monitors the motion of the partition 15 directly (i.e., without using information from components of the drive system 20, such as motor current).

In one embodiment, the controller 30 is a stand-alone processing unit that is in communication with both the drive system 20 and the monitoring system 25. In another embodiment, the controller may comprise circuitry that is integrated directly into components of the drive system 20, the partition monitoring system 25, or a combination thereof. The controller 30 transmits data to, and receives data from, the drive system 20, and receives data from the monitoring system 25. As a result, the controller 30 can control motion of the partition 15 using the drive system 20 (e.g., a motor of the drive system 20), while tracking the speed, position, direction of travel, and/or acceleration of the partition 15 using the monitoring system 25. In some embodiments, such as those described below, the controller 30 uses data from the monitoring system 25 to mitigate potentially hazardous conditions associated with the drive system 20. For example, the controller 30 stops the operation of a motor of the drive system 20 to reduce a potentially hazardous condition. The controller 30 can also use information from the monitoring system 25 to detect failure of drive system components. For example, a motor of the drive system 20 may be designed to run at a certain speed during operation. Motor failure can be potentially detected if the monitoring system 25 sends information indicative of fluctuating motor speed during operation.

Figure 2:
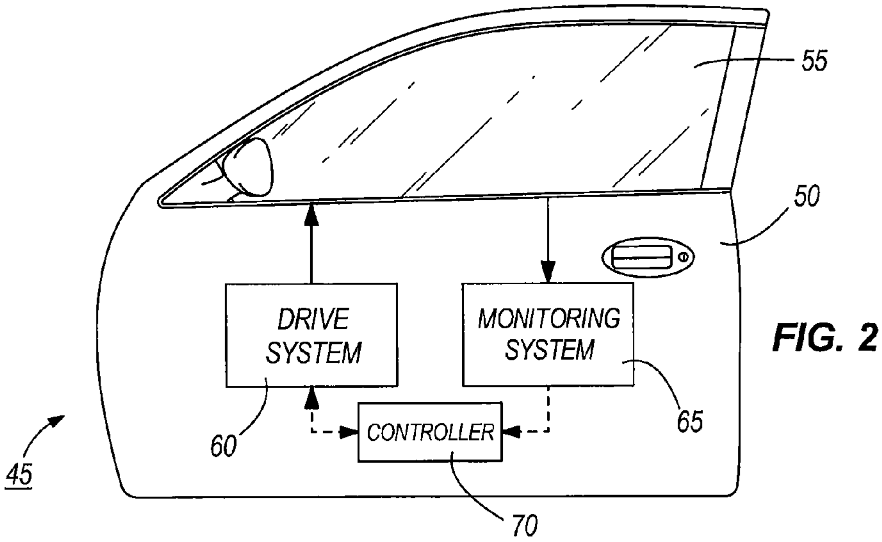
FIG. 2 illustrates an exemplary system, which includes a vehicle door having a partition and a partition monitoring system.

FIG. 2 illustrates an exemplary system 45, which includes a partition 55 of a vehicle door 50. The system 45 also includes a drive system 60, a partition monitoring system 65, and a controller 70, which are similar to those shown in FIG. 1.

The window 55 is driven up and down using the drive system 60. In some embodiments, the drive system 60 is regulated by the controller 70, which receives input signals from control buttons (not shown). For example, a user can actuate an "UP" control button positioned on the vehicle door 50 to move the window 55 from an open or lowered position to a closed or raised position. In some embodiments, the user must continually actuate the control button to keep the window 55 in motion. In other embodiments, the drive system 60 and controller 70 are equipped with an "automatic open" or "automatic close" function. As a result, the user can fully open or fully close the window 55 with a single, momentary actuation of a control button.

In the embodiment shown in FIG. 2, the monitoring system 65 is independent of or decoupled from the drive system 60, and is used to monitor the speed, position, direction of travel, and/or acceleration of the window 55. To do so, the monitoring system 65 transmits monitored data to the controller 70 as the window 55 moves from a fully open or lowered position to a fully closed or raised position. The controller 70, upon receiving the data from the monitoring system 65, determines whether to allow the drive system 60 to move the window 55. For example, the controller 70 determines whether to allow a motor (not shown) of the drive system 60 to continue operating, or whether to stop operation of the motor. Methods of determining the speed, position, direction of travel, and/or acceleration of the window 55 using the controller 70 and the monitored data (from the monitoring system 65) are known by those skilled in the art. The controller 70 can prevent the window 55 from closing if the data from the monitoring system 65 indicates the presence of an object in the path of the window 55. Additionally, in one embodiment, the controller 70 can reverse the direction of the motor of the drive system 60 if the monitoring system 65 indicates the presence of an object in the path of the window 55. Known algorithms or other methods, for example, the methods described in U.S. Pat. No. 6,456,027, assigned to Robert Bosch GmbH, can be used to indicate the presence of an object in the path of the window 55.

Figure 3:
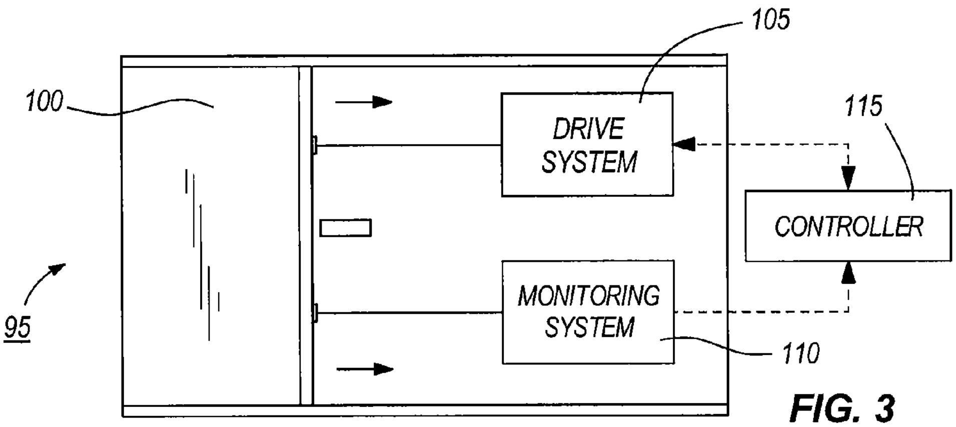
FIG. 3 illustrates an exemplary system, which includes a slidable door having a partition monitoring system.

FIG. 3 illustrates an exemplary system 95, which includes a slidable or sliding door 100. The system 95 also includes a drive system 105, a partition monitoring system 110, and a controller 115. The sliding door 100 could be implemented in a vehicle (not shown), for example, such as a van.

The sliding door 100 is driven open or closed using the drive system 105, similar to the embodiment shown in FIG. 2. Alternatively or additionally, in one embodiment, a user can actuate a control button on a remote keyless entry ("RKE") fob (not shown) to move the sliding door 100 from an open position to a closed position, or vice versa, automatically. Consistent with FIGS. 1 and 2, the monitoring system 110 is decoupled from the drive system 105, and monitors the speed, position, direction of travel; and/or acceleration of the vehicle door 100.

Figure 4:
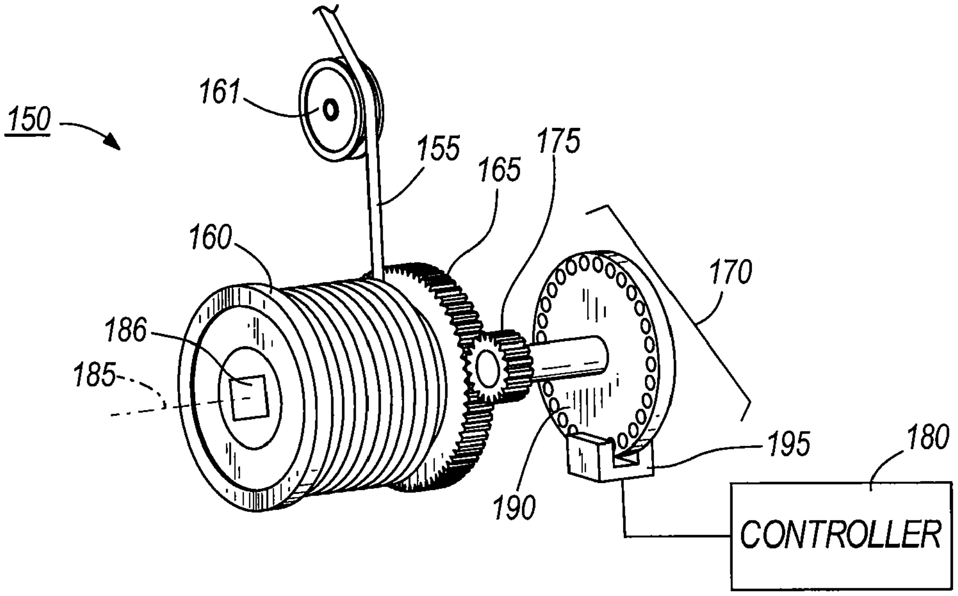
FIG. 4 illustrates an exemplary partition monitoring system.

FIG. 4 illustrates an exemplary embodiment of a movable partition monitoring system 150, which can be used to monitor a partition (not shown). The monitoring system 150 generally includes a cable 155, a drum 160, a drum gear 165, a sensor assembly 170, and a sensor gear 175. In the embodiment shown in FIG. 4, the components of the partition monitoring system 150 are independent of, or decoupled from, a drive system, for example, that may be used to drive the partition. Additionally, the monitoring system 150 can include more components than those shown. For example, in one embodiment, other pulleys are included to support and route the cable 155 along a desirable path.

The cable 155 has two ends. In one embodiment, one of the ends is coupled to a movable partition (not shown), while the other end is coupled to the drum 160. An idler wheel 161 can be included between the movable partition and the drum 160, to route the cable 155 in a desirable path. The length of the cable 155 can be varied according to the application of the monitoring system 150, and is long enough to allow the partition to travel throughout its entire range of motion. The drum 160 is generally rotatable about a central axis 185, which allows the cable 155 to be wound around the drum 160 or unwound from the drum 160 as the end of the cable that is coupled to the movable partition moves. The diameter of the drum can also be varied according to the application. In some embodiments, the drum 160 includes an internal tensioner or spring (represented by block 186) or other suitable mechanism that provides a tensioning force for the cable 155. For example, the spring 186 provides the force required to wind the cable around the drum as the partition moves toward the drum. Additionally, a stopping device may be coupled to the cable 155 and the partition so that the tensioning force provided by the spring 186 is not completely alleviated.

In another embodiment, one end of the cable 155 is coupled to a stationary object (e.g., a door frame), while the other end of the cable is coupled to the drum 160. The drum 160, in turn, is coupled to the movable partition. Such an arrangement also allows the cable 155 to be unwound from, or wound around, the drum 160 as the partition moves.

As the cable 155 is unwound from, or wound around, the rotatable drum 160, the rotation of the drum 160 causes the drum gear 165 to turn. As a result, the sensor gear 175 that is mated with the drum gear 165 also turns. The rotation of the sensor gear 175 causes a disc 190 of the sensor assembly 170 to rotate. A sensing element 195 of the sensor assembly 170 monitors the motion of the disc 190, and transmits corresponding signals to a controller 180. The controller 180 determines the speed, position, direction of travel, and/or acceleration of the partition from the signals generated by the sensing element 195. For example, the speed of the partition is determined by monitoring the rate at which the disc 190 turns with respect to the sensing element 195. The acceleration of the partition is determined by monitoring a change in speed of the disc 190 over a certain period of time. The position of the partition is determined by monitoring the rotation of the disc 190 with respect to the sensing element 195 (as described in greater detail below). Additionally, the direction in which the partition is traveling is determined by monitoring the direction in which the disc 190 turns with respect to the sensing element 195 or, in other embodiments, multiple sensing elements. Other methods, as previously described, can also be used to determine the speed, position, direction of travel, and/or acceleration of the partition, as well as determine the presence of an object in the path of the partition.

Figure 5A:
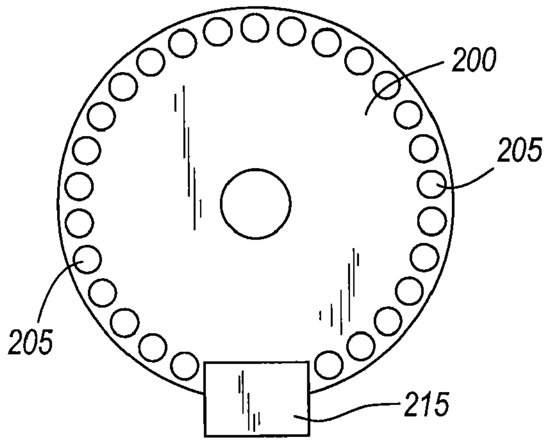
FIG. 5A illustrates an end view of an aperture disc and optical sensor.

FIG. 5A illustrates one embodiment of the sensor assembly 170, which includes an aperture disc 200 having apertures 205, and one or more optical sensing elements 215. In the embodiment shown, one of the optical sensing elements 215 transmits a light beam (not shown) to an opposing sensing element 215. As the aperture disc 200 rotates, the light beam is interrupted by solid portions of the disc 200 (e.g., between the apertures 205). The reception (or lack thereof) of the light beam is used to determine the speed, position, direction of travel, and/or acceleration of the disc 200, and hence, the partition. For example, the position of the partition can be determined by monitoring the number of apertures that pass by the sensing elements 215. In other embodiments, the light beam is transmitted and received by the same sensing element, using an opposing element to reflect the light beam. In the embodiment shown in FIG. 5A, the resolution of the sensor assembly 170 is determined by the number of apertures in the disc 200, the gear ratio of the drum gear 165, the sensor gear 175, and the diameter of the drum 160, and the diameter of the aperture disc 200.

Figure 5B:
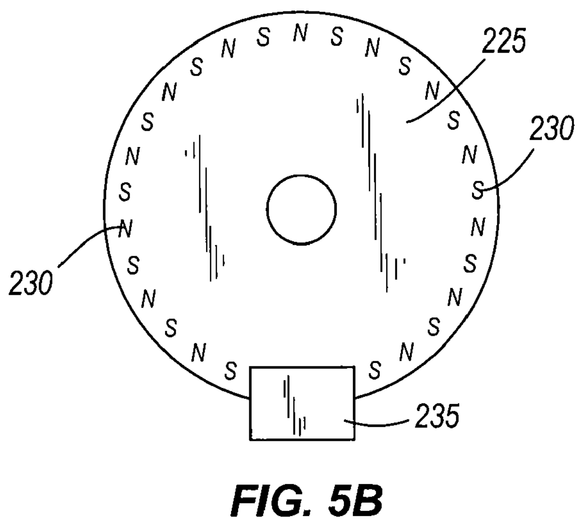
FIG. 5B illustrates an end view of a ring magnet and magnetic sensor.

FIG. 5B illustrates another embodiment of the sensor assembly 170, which includes a magnetic disc or ring magnet 225 having poles 230, and one or more magnetic sensing elements 235 (e.g., Hall effect sensing elements). In the embodiment shown, the magnetic sensing elements 235 detect magnetic fields produced by the poles 230. As the magnetic disc 225 rotates, the magnetic fields alternate between a north pole and a south pole. The changing magnetic fields are used to determine the speed, position, direction of travel, and/or acceleration of the magnetic disc 225, and hence, the partition. In the embodiment shown in FIG. 5B, the resolution of the sensor is determined by the number of poles on the magnetic disc 225, the gear ratio between the drum gear 165 and the sensor gear 175, the diameter of the drum 160, and the diameter of the magnetic disc 225.

In other embodiments, the monitoring system 150 can employ other types of sensors to monitor the rotation of the drum 160. For example, the monitoring system 150 is not limited to an electromechanical configuration that includes a drum 160 and a cable 155. In other embodiments, proximity or infrared sensors can be used to monitor the motion of a partition. Additionally, the components of the monitoring system 150 may be arranged differently. For example, in alternative embodiments, magnets and/or apertures can be directly incorporated or integrated into an end of the drum 160. As a result, Hall effect and/or optical sensors can monitor the rotation of the drum directly, and the drum gear 165 and sensor gear 175 can be eliminated from the system 150. Such a configuration can impact the resolution of the sensor. Accordingly, the specific implementation of the monitoring system 150 can depend on, among other things, the required resolution of the application at hand. Other alternative embodiments of the system 150 should be appreciated by those skilled in the art.

It is also to be appreciated that, at least in some embodiments, one or more of the components of a partition monitoring system may be included in, or shared with, a drive system of a partition. For example, in one embodiment, the partition monitoring system may use a pulley that is part of the partition drive system. In another embodiment, the partition monitoring system may be powered by a supply that is distributed to both the drive system and the monitoring system.

Various embodiments are set forth in the following claims.

The invention claimed is:

1. A system for monitoring a movable partition of a vehicle, the system comprising:

a drive system, located within a door of the vehicle, and configured to move the movable partition;

a sensor, located within the door, and mechanically linked to the partition, but decoupled from the drive system and configured to transmit a signal indicative of the motion of the partition; and a controller configured to receive the transmitted signal, to calculate at least one of a speed, acceleration, position, and direction of movement of the movable partition based upon the transmitted signal, and to generate a signal indicative of an obstruction in a path of the movable partition based on the at least one of a speed, acceleration, position, and direction of movement of the movable partition calculated by the controller based upon the transmitted signal.

2. A system for monitoring a movable partition in a vehicle door, the system comprising:

a cable, located within the door, and having a first end and a second end;

a movable partition configured to be coupled to the first end of the cable;

a drive system configured to move the movable partition along a path, and to be located within the vehicle door;

a drum configured to be coupled to the second end of the cable, wherein the drum is independent of the drive system, and to be located within the vehicle door;

a sensor configured to transmit a signal indicative of the rotational motion of the drum and to be located within the vehicle door; and a controller configured to receive the transmitted signal, to calculate at least one of a speed, acceleration, position, and direction of movement of the movable partition based on the transmitted signal, and to generate an obstruction signal indicative of an obstruction in the path based on the at least one of a speed, acceleration, position, and direction of movement of the movable partition calculated by the controller based upon the transmitted signal.

3. The movable partition monitoring system of claim 2, wherein the sensor comprises an aperture disc and at least one optical sensing element.

4. The movable partition monitoring system of claim 2, wherein the sensor comprises a ring magnet and at least one magnetic sensing element.

5. The movable partition monitoring system of claim 2, wherein the controller is further configured to transmit, to the drive system, the obstruction signal indicative of an obstruction in a path of the movable partition.

6. The movable partition monitoring system of claim 5, wherein the obstruction signal that is transmitted by the controller to the drive system includes control information to stop or slow a motor of the drive system.

7. The movable partition monitoring system of claim 5, wherein the obstruction signal that is transmitted by the controller to the drive system includes control information to reverse the direction of a motor of the drive system.

8. The movable partition monitoring system of claim 2, further comprising a stationary object positioned proximate to the movable partition, and wherein the drum is coupled to the stationary object and the first end of the cable is coupled to the movable partition.

9. The movable partition monitoring system of claim 2, further comprising a stationary object proximate to the movable partition, the stationary object configured to be coupled to the first end of the cable, and the drum configured to be coupled to the movable partition.

10. The movable partition monitoring system of claim 2, wherein tension in the cable is provided by a spring positioned within the drum.

11. The movable partition monitoring system of claim 2, further comprising at least one idler wheel positioned between the first and second ends of the cable.

12. A method of monitoring a movable partition in a vehicle door, the method comprising:

providing a sensor configured to be independent of a drive system for the movable partition within the vehicle door;

linking the sensor and the movable partition via an attachment element within the vehicle door;

generating, with the sensor within the vehicle door, a first signal indicative of motion of the partition;

receiving, by a controller, the first signal;

generating, via the controller, a second signal using data from the first signal, the second signal indicative of at least one of a speed, a position, a direction of travel, and an acceleration of the movable partition; and generating a third signal indicative of an obstruction in a path of the movable partition using the second signal.

13. The method of claim 12, wherein providing a sensor includes providing a rotatable drum.

14. The method of claim 13, wherein generating, with the sensor, a first signal indicative of motion of the partition includes generating a signal indicative of rotational motion of the rotatable drum.

15. The method of claim 12, wherein the third signal includes control information to stop the drive system.

16. The method of claim 12, further comprising generating a fourth signal via the controller, the fourth signal including control information to reverse a direction of travel of the movable partition.

17. The method of claim 13, wherein generating the first signal comprises sensing at least one of speed, direction, position, and acceleration of an aperture disc coupled to the drum using an optical sensing element.

18. The method of claim 13 wherein generating the first signal comprises sensing at least one of speed, direction, position, and acceleration of a ring magnet coupled to the drum using a magnetic sensing element.

19. A vehicle comprising:

a door;

a movable partition within the door;

a drive system, located within the door, and configured to move the movable partition;

a sensor, located within the door, and mechanically linked to the partition, but decoupled from the drive system and configured to transmit a signal indicative of the motion of the partition; and a controller configured to receive the transmitted signal, to calculate at least one of a speed, acceleration, position, and direction of movement of the movable partition based upon the transmitted signal, and to generate an obstruction signal indicative of an obstruction in a path of the movable partition based on the at least one of a speed, acceleration, position, and direction of movement of the movable partition calculated by the controller based upon the transmitted signal.

20. The vehicle of claim 19, wherein the obstruction signal that is generated by the controller includes control information to stop or slow a motor of the drive system.

21. The vehicle of claim 19, wherein the obstruction signal that is generated by the controller includes control information to reverse the direction of a motor of the drive system.

22. The vehicle of claim 19, wherein the sensor comprises an aperture disc and an optical sensing element.

23. The vehicle of claim 19, wherein the sensor comprises a ring magnet and at least one magnetic sensing element.

24. The vehicle of claim 19, wherein the drum is configured to be coupled to the vehicle.

25. The vehicle of claim 19, further comprising a cable having first and second ends, and wherein the first end of the cable is configured to be coupled to the vehicle and the drum is configured to be coupled to the movable partition.

26. The vehicle of claim 25, wherein tension in the cable is provided by a spring positioned within the drum.

27. The vehicle of claim 25, further comprising at least one idler wheel is positioned between the first and second ends of the cable.

* * * * *